(12) United States Patent
Chen et al.

(10) Patent No.: US 12,294,282 B2
(45) Date of Patent: May 6, 2025

(54) MOTOR AND VACUUM CLEANER (71) Applicants: Gree Electric Appliances, Inc. of Zhuhai, Guangdong (CN); ZHUHAI KAIBANG MOTOR MANUFACTURE CO., LTD, Zhuhai (CN)

(72) Inventors: Bin Chen, Guangdong (CN); Yusheng Hu, Guangdong (CN); Shengyu Xiao, Guangdong (CN); Lin Tang, Guangdong (CN); Shaoxuan Zhu, Guangdong (CN); Weili Sun, Guangdong (CN); Guomang Yang, Guangdong (CN); Jinlong Wang, Guangdong (CN); Zhidong Zhang, Guangdong (CN)

(73) Assignees: Gree Electric Appliances, Inc. of Zhuhai, Guangdong (CN); Zhuhai Kaibang Motor Manufacture Co., Ltd, Zhuhai (CN)

( * ) Notice: Subject to any disclaimer, the term of this patent is extended or adjusted under 35 U.S.C. 154(b) by 365 days.

(21) Appl. No.: 17/771,342

(22) PCT Filed: Sep. 4, 2020

(86) PCT No.: PCT/CN2020/113468
§ 371 (c)(1),
(2) Date: Apr. 22, 2022

(87) PCT Pub. No.: WO2021/098343
PCT Pub. Date: May 27, 2021

(65) Prior Publication Data
US 2022/0372993 A1 Nov. 24, 2022

(30) Foreign Application Priority Data

Nov. 18, 2019 (CN) .......................... 201911131001.9

(51) Int. Cl.
*H02K 9/06* (2006.01)
*A47L 5/22* (2006.01)
(Continued)

(52) U.S. Cl.
CPC .................. *H02K 9/06* (2013.01); *A47L 5/22* (2013.01); *A47L 9/0081* (2013.01);
(Continued)

(58) Field of Classification Search
CPC ............ H02K 9/06; H02K 5/04; H02K 5/207; H02K 7/14; A47L 5/22; A47L 9/0081;
(Continued)

(56) References Cited

U.S. PATENT DOCUMENTS

2003/0228215 A1  12/2003  Kariya et al.
2017/0126076 A1  5/2017  Yoon et al.
(Continued)

FOREIGN PATENT DOCUMENTS

CN  1641227 A  7/2005
CN  102777395 A  11/2012
(Continued)

OTHER PUBLICATIONS

Machine Translation of Japanese Patent Publication JP 2010-209770 A; Inventor: Yasuaki; Title: Electric Blower and Electric Vacuum Cleaner; Published: Sep. 24, 2010. (Year: 2010).*
(Continued)

*Primary Examiner* — Mary A Davis
(74) *Attorney, Agent, or Firm* — The Webb Law Firm (57) ABSTRACT

A motor includes a housing, an impeller and a diffuser in the housing, a rotor assembly and a stator assembly, the motor has an air inlet on the housing and an air outlet, the impeller is disposed adjacent to the air inlet and is connected to the rotor assembly, the diffuser is located downstream of the impeller, the stator assembly is located downstream of the
(Continued)

diffuser, the housing includes a front housing and a rear housing connected to each other, a first air duct is enclosed among a rear inner wall of the front housing, a front inner wall of the rear housing and the diffuser and in communication with an outlet of the impeller and the air outlet, and an inner diameter size of the rear end of the rear inner wall is less than or equal to that of the front end of the front inner wall.

15 Claims, 4 Drawing Sheets (51) Int. Cl.
| | | |
|---|---|---|
| *A47L 9/00* | (2006.01) | |
| *F04D 25/06* | (2006.01) | |
| *F04D 29/42* | (2006.01) | |
| *F04D 29/44* | (2006.01) | |
| *F04D 29/58* | (2006.01) | |
| *H02K 5/04* | (2006.01) | |
| *H02K 5/20* | (2006.01) | |
| *H02K 7/14* | (2006.01) | |

(52) U.S. Cl.
CPC ..... *F04D 25/0606* (2013.01); *F04D 29/4253* (2013.01); *F04D 29/441* (2013.01); *F04D 29/5806* (2013.01); *H02K 5/04* (2013.01); *H02K 5/207* (2021.01); *H02K 7/14* (2013.01); *F05D 2250/52* (2013.01)

(58) Field of Classification Search
CPC ............. F04D 25/0606; F04D 29/4253; F04D 29/441; F04D 29/5806; F05D 2250/52
See application file for complete search history.

(56) References Cited

U.S. PATENT DOCUMENTS

| | | |
|---|---|---|
| 2018/0172024 A1 | 6/2018 | Hayamitsu et al. |
| 2018/0278109 A1 | 9/2018 | Murata |

FOREIGN PATENT DOCUMENTS

| | | |
|---|---|---|
| CN | 204532894 U | 8/2015 |
| CN | 105024491 A | 11/2015 |
| CN | 105156346 A | 12/2015 |
| CN | 106659348 A | 5/2017 |
| CN | 106972655 A | 7/2017 |
| CN | 106989034 A | 7/2017 |
| CN | 107612216 A | 1/2018 |
| CN | 208539718 U | 2/2019 |
| CN | 209164112 U | 7/2019 |
| DE | 29717906 U1 | 2/1999 |
| JP | S5297412 A | 8/1977 |
| JP | 2006250016 A | 9/2006 |
| JP | 3915067 B2 | 2/2007 |
| JP | 2010209770 A | 9/2010 |
| JP | 2011064096 A | 3/2011 |
| KR | 1020130091841 A | 8/2013 |

OTHER PUBLICATIONS

Machine Translation of Korean Patent Publication KR 10-2013-0091841; First Inventor: Lee; Title: A Vacuum Suction Unit and a Vacuum Cleaner Comprising the Vacuum Suction Unit: Published: Aug. 20, 2013. (Year: 2013).*

Machine Translation of Chinese Patent Publication CN 208539718 U; Inventor: Ni; Title: A Motor for a Hair Care Appliance; Published Feb. 22, 2019. (Year: 2019).*

* cited by examiner

MOTOR AND VACUUM CLEANER

CROSS-REFERENCE TO RELATED APPLICATIONS

This application is the United States national phase of International Application No. PCT/CN2020/113468 filed Sep. 4, 2020, and claims priority to Chinese Patent Application No. 201911131001.9 filed on Nov. 18, 2019, the disclosures of which are hereby incorporated by reference in their entirety.

FIELD OF THE DISCLOSURE

The present disclosure relates to the technical field of vacuum cleaning devices, and specifically to a motor and a vacuum cleaner.

BACKGROUND OF THE DISCLOSURE

At present, the motor in a vacuum cleaner uses a metal housing, and airflow enters through an inlet of the metal housing. After passing through an impeller, the airflow is higher in flow rate and the flow direction is along a radial outward direction of the housing. The airflow is impacted onto the inner wall of the housing vertically, and then a fluidic direction is forcibly changed. The inventors realized that the airflow is impacted onto the housing directly, which will cause the problem of kinetic energy loss, an eddy current and noise.

In view of the above problem, the inventors know a centrifugal fan which includes a housing, an impeller, a stator blade assembly, and a motor. The housing has an air inlet and an air outlet, both the impeller and the stator blade assembly are disposed in the housing, the impeller is disposed adjacent to the air inlet, the stator blade assembly is located downstream of the impeller, an air duct suitable for flowing of the airflow is defined between the stator blade assembly and the inner wall of the housing, the motor is disposed downstream of the stator blade assembly and is connected to the impeller, a parallel axis cross-section of the air duct (the parallel axis cross-section of the air duct refers to a cross-section obtained by cutting the air duct along a plane passing through a rotation center axis of the impeller) is U-shaped, which effectively reduces the loss generated in a flowing process of the airflow in the air duct and reduces the noise. The housing includes a front cover and a rear baffle connected to each other. The air inlet is formed in the front cover and the air outlet is formed in the rear baffle. The front end of the rear baffle is inserted into the rear end of the front cover. A parallel axis cross-section of the rear inner wall surface of the front cover is linear, and a parallel axis cross-section of the outer front end surface of the rear baffle is arc-shaped, so that the connected position between the outer front end surface of the rear baffle and an outer peripheral surface thereof forms a sharp corner. The inventors have realized that in the process of flowing from the rear inner wall surface of the front cover to the outer front end surface of the rear baffle, the airflow will be collided at the sharp corner, causing the problem of energy loss and noise.

SUMMARY OF THE DISCLOSURE

Based on this, the present disclosure provides a motor and a vacuum cleaner to solve the problem of the energy loss and noise caused by the fact that the airflow will be collided when flowing by the connected position between the rear inner wall surface of the front cover and the outer front end surface of the rear baffle in the related art.

The present disclosure provides a motor, including a housing, an impeller, a diffuser, a rotor assembly and a stator assembly, wherein the motor has an air inlet and an air outlet, the air inlet is disposed on the housing, the impeller and the diffuser are disposed in the housing, the impeller is disposed adjacent to the air inlet and is connected to the rotor assembly, the diffuser is located downstream of the impeller, the stator assembly is located downstream of the diffuser, wherein the housing includes a front housing and a rear housing connected to each other, a first air duct is enclosed among a rear inner wall of the front housing, a front inner wall of the rear housing and the diffuser, the first air duct is in communication with an outlet of the impeller and the air outlet, and an inner diameter size of the rear end of the rear inner wall is less than or equal to an inner diameter size of the front end of the front inner wall.

In some embodiments, a longitudinal cross-section of the first air duct is U-shaped.

In some embodiments, the inner wall of the front housing is smooth to avoid backflow of airflow.

In some embodiments, the inner wall of the front housing includes a first inner wall, a second inner wall and a third inner wall which are connected in sequence, the first inner wall is disposed corresponding to the impeller, a longitudinal cross-section of the first inner wall is in an arc shape which is convexly curved relative to the impeller, the second inner wall and the third inner wall are disposed corresponding to the diffuser, a longitudinal cross-section of the second inner wall is linear along a radial direction of the impeller, and the longitudinal cross-section of the second inner wall is in an arc shape which is concavely curved relative to the diffuser.

In some embodiments, the first inner wall is gradually transitioned outward from an axial direction of the impeller to the second inner wall.

In some embodiments, the inner wall of the front housing further includes a fourth inner wall connected to the rear end of the third inner wall, a longitudinal cross-section of the fourth inner wall is linear along the axial direction of the impeller, the fourth inner wall is disposed corresponding to the diffuser, and the fourth inner wall forms the rear end of the rear inner wall.

In some embodiments, the inner wall of the rear housing includes a first inner wall section, a second inner wall section and a third inner wall section which are connected in sequence, a longitudinal cross-section of the first inner wall section is linear along the axial direction of the impeller, a longitudinal cross-section of the second inner wall section is in an arc shape which is concavely curved relative to the diffuser, a longitudinal cross-section of the third inner wall section is linear along the radial direction of the impeller, and the first inner wall section forms the front end of the front inner wall.

In some embodiments, a material of the impeller is a non-metallic material.

In some embodiments, the material of the impeller is PEEK.

In some embodiments, the stator assembly is located in the rear housing, a second air duct is enclosed between inner walls of the stator assembly and the rear housing, and the second air duct is in communication with the first air duct and the air outlet.

In some embodiments, the stator assembly includes a frame and an iron core and a winding which are fixed on the frame, the iron core is provided with an air duct hole, the air duct hole is in communication with the first air duct and the air outlet, and/or, a third air duct is disposed in the winding, and the third air duct is in communication with the first air duct and the air outlet.

In some embodiments, the stator assembly includes a frame and an iron core and a winding which are fixed on the frame, the iron core is provided with an air duct hole, the air duct hole is in communication with the first air duct and the air outlet, or a third air duct is disposed in the winding, and the third air duct is in communication with the first air duct and the air outlet.

In some embodiments, the stator assembly is fixed in the rear housing or on a fixing bracket of the rotor assembly.

The present disclosure further provides a motor, including a housing, an impeller, a diffuser, a rotor assembly and a stator assembly, wherein the motor has an air inlet and an air outlet, the air inlet is disposed on the housing, the impeller and the diffuser are disposed in the housing, the impeller is disposed adjacent to the air inlet and is connected to the rotor assembly, the diffuser is located downstream of the impeller, the stator assembly is located downstream of the diffuser, the housing includes a front housing and a rear housing which are connected to each other, a first air duct is enclosed among a rear inner wall of the front housing, a front inner wall of the rear housing and the diffuser, the first air duct is in communication with an outlet of the impeller and the air outlet, an inner diameter size of the rear end of the rear inner wall is less than or equal to an inner diameter size of the front end of the front inner wall, a longitudinal cross-section of the first air duct is U-shaped, and the inner wall of the front housing is smooth to avoid backflow of airflow.

The present disclosure further provides a vacuum cleaner, including a motor, wherein the motor includes a housing, an impeller, a diffuser, a rotor assembly and a stator assembly, the motor has an air inlet and an air outlet, the air inlet is disposed on the housing, the impeller and the diffuser are disposed in the housing, the impeller is disposed adjacent to the air inlet and is connected to the rotor assembly, the diffuser is located downstream of the impeller, the stator assembly is located downstream of the diffuser, the housing includes a front housing and a rear housing which are connected to each other, a first air duct is enclosed among a rear inner wall of the front housing, a front inner wall of the rear housing and the diffuser, the first air duct is in communication with an outlet of the impeller and the air outlet, and an inner diameter size of the rear end of the rear inner wall is less than or equal to an inner diameter size of the front end of the front inner wall.

In the technical solution of the present disclosure, the first air duct is enclosed among the rear inner wall of the front housing, the front inner wall of the rear housing and the diffuser. The first air duct is in communication with the outlet of the impeller and the air outlet. The inner diameter size of the rear end of the rear inner wall is less than or equal to the inner diameter size of the front end of the front inner wall, that is, the front end of the front inner wall does not exceed the rear end of the rear inner wall, so that a sharp corner is not formed at the connected position between the rear inner wall and the front inner wall, and the airflow will not be collided in the process of flowing from the rear inner wall to the front inner wall, which further reduces the energy loss and noise, thereby ensuring that the airflow generates less loss at the connected position of the rear inner wall and the front inner wall.

BRIEF DESCRIPTION OF THE DRAWINGS

In order to describe the technical solutions in specific implementations of the present disclosure or the related art more clearly, the following briefly introduces the accompanying drawings required to be used in description of the specific implementations or the related art. Apparently, the accompanying drawings in the following description show some implementations of the present disclosure, and a person of ordinary skill in the art may still derive other drawings from these accompanying drawings without creative efforts.

DETAILED DESCRIPTION

The technical solutions of the present disclosure will be clearly and completely described below in conjunction with the accompanying drawings. It is obvious that the described embodiments are only part but not all of the embodiments of the present disclosure. All other embodiments obtained by those skilled in the art without creative efforts based on the embodiments in the present disclosure are within the protection scope of the present disclosure.

In the descriptions of the present disclosure, it should to be noted that orientation or positional relationships indicated by the terms "center", "upper", "lower", "left", "right", "vertical", "horizontal", "inner", "outer", "front", "rear", etc. are orientation or positional relationships shown on the basis of the drawings, only for the purpose of the ease in describing the present disclosure and simplification of its descriptions, but not indicating or implying that the specified device or element has to be specifically located, and structured and operated in a specific direction, and therefore, should not be understood as limitations to the present disclosure. Moreover, the terms "first", "second" and "third" are only for the purpose of description and should not be construed as indicating or implying relative importance In the description of the present disclosure, unless otherwise specified and limited, it should be noted that the terms "mounted", "connected with each other" and "connected to/with" need to be broadly understood, for example, the connection is fixed connection in some embodiments, detachable connection or integrated connection in some embodiments, mechanical connection in some embodiments, electrical connection in some embodiments, direct connection in some embodiments, indirect connection via an intermediation in some embodiments, or internal communication of two elements in some embodiments. Those of ordinary skill in the art can understand the specific meaning of the above terms in the present disclosure in accordance with specific conditions.

In addition, the technical features involved in different implementations of the present disclosure described below can be combined with each other in some embodiments as long as they do not conflict with each other.

Figure 1:
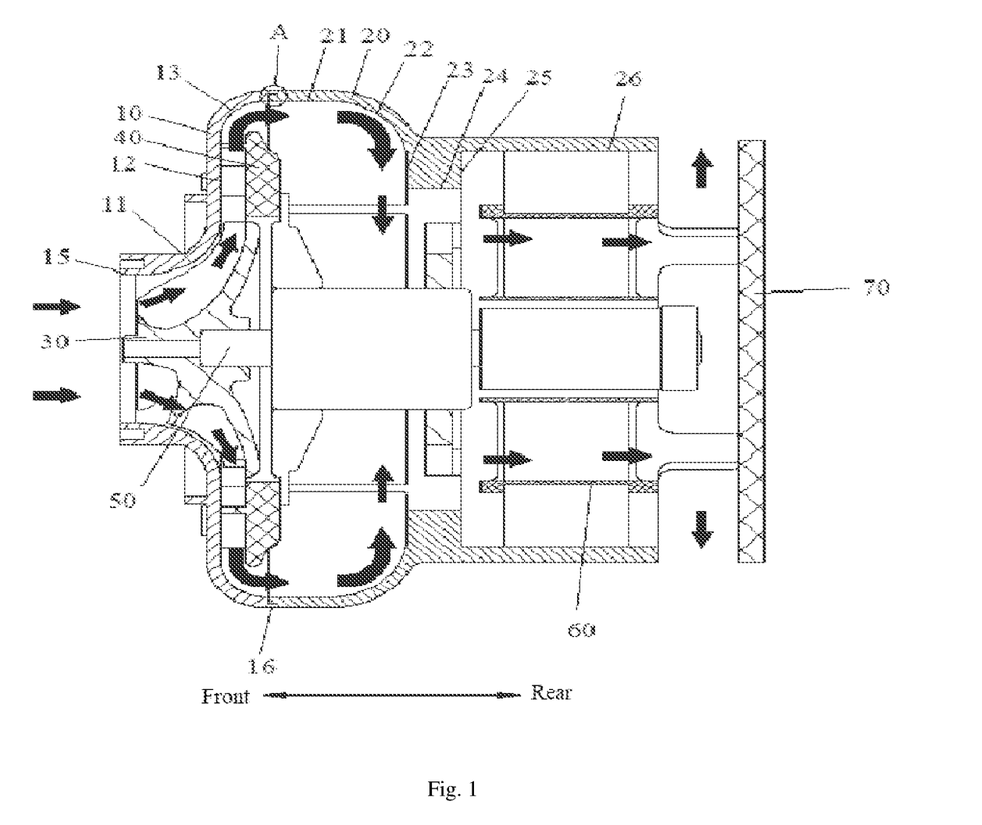
FIG. 1 shows a schematic cross-sectional diagram of a motor according to the present disclosure.
Figure 2:
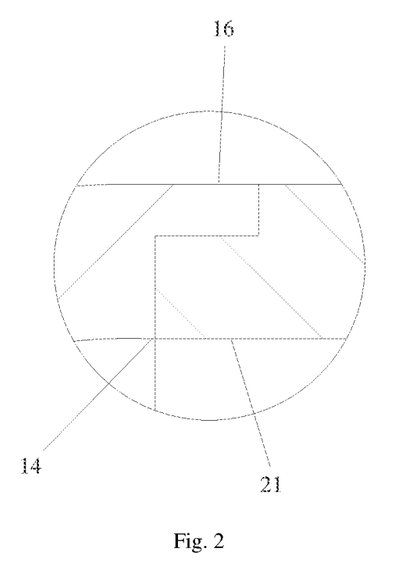
FIG. 2 shows an enlarged schematic diagram of position A of the motor of FIG. 1.

Please refer to FIG. 1 and FIG. 2, the present disclosure provides a motor including a housing, an impeller 30, a diffuser 40, a rotor assembly 50 and a stator assembly 60. The motor has an air inlet and an air outlet. The air inlet is disposed on the housing. The impeller 30 and the diffuser 40 are disposed in the housing. The impeller 30 is disposed adjacent to the air inlet and is connected to the rotor assembly 50. The diffuser 40 is located downstream of the impeller 30. The stator assembly 60 is located downstream of the diffuser 40. The housing includes a front housing 10 and a rear housing 20 connected to each other. A first air duct is enclosed among a rear inner wall of the front housing 10, a front inner wall of the rear housing 20 and the diffuser 40. The first air duct is in communication with an outlet of the impeller 30 and the air outlet. An inner diameter size of the rear end of the rear inner wall is less than or equal to an inner diameter size of the front end of the front inner wall, wherein the front and rear refers to the front and rear direction in FIG. 1.

In some embodiments, the first air duct is enclosed among the rear inner wall of the front housing 10, the front inner wall of the rear housing 20 and the diffuser 40. The first air duct is in communication with the outlet of the impeller 30 and the air outlet. The inner diameter size of the rear end of the rear inner wall is less than or equal to the inner diameter size of the front end of the front inner wall. That is, the front end of the front inner wall does not exceed the rear end of the rear inner wall, so that no sharp corner is formed at the connected position of the rear inner wall and the front inner wall. The airflow will not be collided in the process of flowing from the rear inner wall to the front inner wall, which further reduces the energy loss and noise, thereby ensuring that the airflow generates less loss at the connected position of the rear inner wall and the front inner wall.

In some embodiments, a longitudinal cross-section of the first air duct is U-shaped, wherein the longitudinal cross-section of the first air duct refers to a cross-section obtained by cutting the first air duct along a plane passing through an axis of the impeller, the airflow is prevented from being directly impacted onto the housing vertically, and the loss and noise generated by the airflow in the process of flowing in the first air duct are effectively reduced, thereby avoiding the situations of the energy loss, an eddy current and noise, and also solving the problems of insufficient flow field development, low suction efficiency and the like.

In the related art, the inner wall of a front cover has a step at a position corresponding to the outlet of the impeller. There is a gap between an outer peripheral wall of the impeller and the step. When the airflow flows out from the outlet of the impeller, a backflow phenomenon occurs at the gap. In order to solve this problem, in some embodiments, the inner wall of the front housing 10 is smooth to avoid backflow of the airflow. In some embodiments, the inner wall of the front housing 10 includes a first inner wall 11, a second inner wall 12, and a third inner wall 13 which are connected in sequence. The first inner wall 11 is disposed corresponding to the impeller 30, and a longitudinal cross-section of the first inner wall 11 is in an arc shape which is convexly curved relative to the impeller 30. The second inner wall 12 and the third inner wall 13 are disposed corresponding to the diffuser 40. A longitudinal cross-section of the second inner wall 12 is linear along a radial direction of the impeller 30. The longitudinal cross-section of the second inner wall 12 is in an arc shape which is concavely curved relative to the diffuser 40. The longitudinal cross-section refers to a cross-section obtained by cutting the front housing along the plane passing through the axis of the impeller. The front housing is simple in structure, and is convenient for processing and manufacturing, and the cost is reduced.

In some embodiments, the first inner wall 11 is gradually transitioned outward from an axial direction of the impeller 30 to the second inner wall 12. Outside air enters the front housing from the air inlet. Under actions of the impeller 30 and the first inner wall 11, axial flow of the airflow is changed to radial flow, and the airflow is smoothly transitioned between the second inner wall 12 and the diffuser 40. Then through the third inner wall 13, the radial flow of the airflow is changed to the axial flow.

In some embodiments, the inner wall of the front housing 10 further includes a fourth inner wall 14 connected to the rear end of the third inner wall 13, and a longitudinal cross-section of the fourth inner wall 14 is linear along the axial direction of the impeller 30. The fourth inner wall 14 is disposed corresponding to the diffuser 40. The fourth inner wall 14 forms the rear end of the rear inner wall. The fourth inner wall is convenient for connection with the rear housing, and the connection is simple and convenient.

In some embodiments, the inner wall of the front housing 10 further includes a fifth inner wall section 25 connected to the front end of the first inner wall 11. A longitudinal cross-section of the fifth inner wall section 25 is linear along the axial direction of the impeller 30. The outer wall of the front housing 10 includes a first outer wall, a second outer wall, a third outer wall, a fourth outer wall, and a fifth outer wall which are connected in sequence. A longitudinal cross-section of the first outer wall is linear along the axial direction of the impeller 30. A longitudinal cross-section of the second outer wall is in an arc shape which is convexly curved relative to the impeller 30. The first outer wall and the second outer wall are disposed corresponding to the fifth inner wall 15 and the first inner wall 11. A longitudinal cross-section of the third outer wall is linear along the radial direction of the impeller 30 and is disposed corresponding to the second inner wall 12. A longitudinal cross-section of the fourth outer wall is in an arc shape which is concavely curved relative to the diffuser 40 and is disposed corresponding to the third inner wall 13. A longitudinal cross-section of the fifth outer wall 16 is linear along the axial direction of the impeller 30 and is disposed corresponding to the fourth inner wall 14. Due to the above structures, the structure of the front housing is simplified in some embodiments, the processing and manufacturing are convenient, and the production cost is reduced.

In some embodiments, the inner wall of the rear housing 20 includes a first inner wall section 21, a second inner wall section 22 and a third inner wall section 23 which are connected in sequence. A longitudinal cross-section of the first inner wall section 21 is linear along the axial direction of the impeller 30. A longitudinal cross-section of the second inner wall section 22 is in an arc shape which is concavely curved relative to the diffuser 40. A longitudinal cross-section of the third inner wall section 23 is linear along the radial direction of the impeller 30. The first inner wall section 21 forms the front end of the front inner wall. An inner diameter size of the first inner wall section 21 is greater than or equal to an inner diameter size of the fourth inner wall 14. The airflow will not be collided at the connected position of the fourth inner wall and the first inner wall section 21, and energy loss is reduced. Under the action of the second inner wall section 22, the axial flow of the airflow is changed to the radial flow.

In some embodiments, the inner wall of the rear housing 20 further includes a fourth inner wall section 24, a fifth inner wall section 25, and a sixth inner wall section 26 which are connected in sequence. The fourth inner wall section 24 is connected to the rear end of the third inner wall section 23. A longitudinal cross-section of the fourth inner wall section 24 is linear along the axial direction of the impeller 30. A longitudinal cross-section of the fifth inner wall section 25 is linear along the radial direction of the impeller 30. A longitudinal cross-section of the sixth inner wall section 26 is linear along the axial direction of the impeller 30. The longitudinal cross-section refers to a cross-section obtained by cutting the rear housing along the plane passing through the axis of the impeller. Due to the above structures, a rear cavity of the rear housing is relatively large, which facilitates the mounting of the stator assembly. A support structure is enclosed by the third inner wall section 23, the fourth inner wall section 24 and the fifth inner wall section 25 for supporting other components.

In some embodiments, the outer wall of the rear housing 20 includes a first outer wall section, a second outer wall section, and a third outer wall section which are connected in sequence. A longitudinal cross-section of the first outer wall section is linear along the axial direction of the impeller 30 and is disposed corresponding to the first inner wall section. A longitudinal cross-section of the second outer wall section is in an arc shape which is concavely curved relative to the diffuser 40 and is disposed corresponding to the second inner wall section. A longitudinal cross-section of the third outer wall section is linear along the axial direction of the impeller 30 and is disposed corresponding to the fourth inner wall section 24 and the sixth inner wall section 26. In this way, an outer diameter size of the third outer wall section is less outer diameter sizes of the first outer wall section and the fifth outer wall, thereby ensuring that the motor occupies the smallest mounting space, and reducing a motor size and increasing a power density when a motor power remains unchanged.

In some embodiments, the rear end of the front housing and the front end of the rear housing are connected in an inserting way, so that the mounting is simplified without a need to consider the mounting airtightness.

In some embodiments, a material of the impeller 30 is a non-metallic material, and the noise is reduced when the airflow passes through the impeller. In some embodiments, the material of the impeller 30 is PEEK.

In some embodiments, the impeller 30 is a semi-open impeller and a centrifugal impeller. In some embodiments, the diffuser is a vane diffuser, which is convenient to use.

In some embodiments, the stator assembly 60 is located in the rear housing 20. A second air duct is enclosed between the stator assembly 60 and the inner wall of the rear housing 20. The second air duct is in communication with the first air duct and the air outlet. The airflow enters the second air duct after passing through the first air duct, and then flows out from the air outlet. The airflow not only smoothly passes through the rear housing, but also can cool the parts in the rear housing such as the stator assembly and a bearing, thereby avoiding failure of the bearing at high temperature, demagnetization of a permanent magnet at high temperature, and burnout of a winding and other components, and ensuring efficient and stable operation of the motor.

Figure 3:
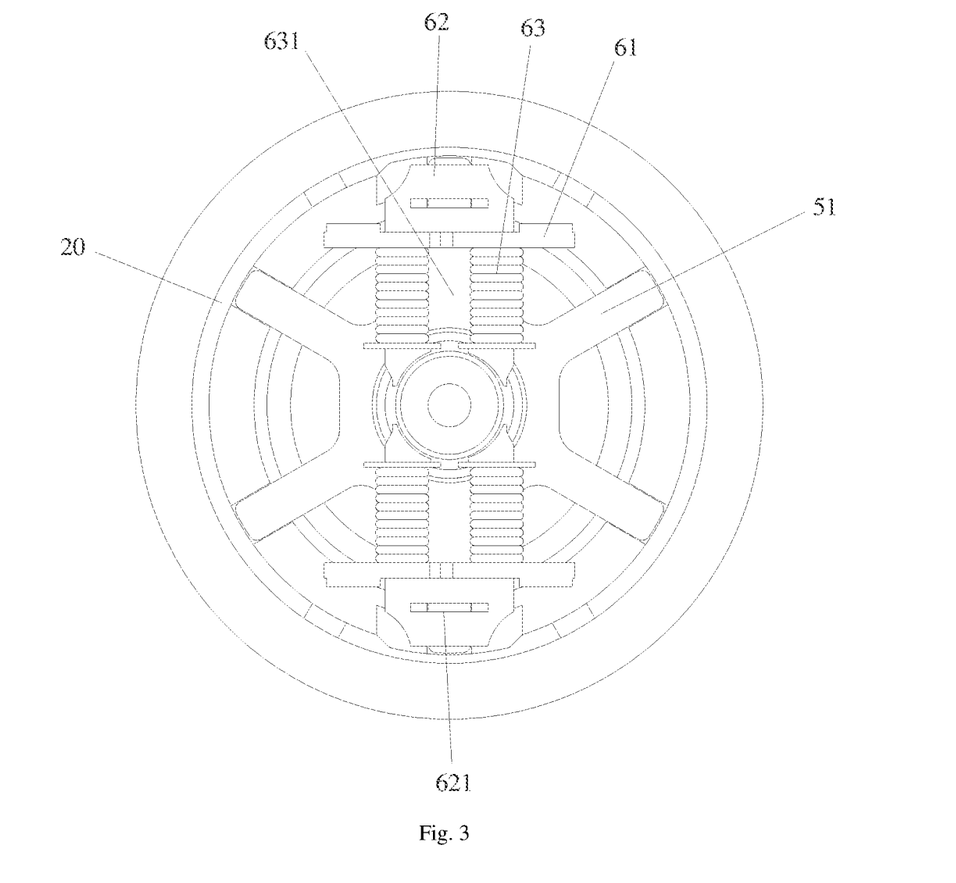
FIG. 3 shows a right schematic diagram of the motor of FIG. 1 without a controller.

In some embodiments, please refer to FIG. 3, the stator assembly 60 includes a frame 61 and an iron core 62 and a winding 63 which are fixed on the frame 61. An air duct hole 621 is disposed in the iron core 62. The air duct hole 621 is in communication with the first air duct and the air outlet. Part of the airflow flowing out of the first air duct enters the air duct hole 621 to dissipate heat from the iron core to reduce iron loss. A third air duct 631 is disposed in the winding 63. The third air duct 631 is in communication with the first air duct and the air outlet. Part of the airflow flowing out of the first air duct enters the third air duct 631 to dissipate heat from the winding, thereby further avoiding the situation that the winding is burnt out at high temperature.

Of course, in some embodiments, the air duct hole and the third air duct are not disposed.

In some embodiments, there are two stator assemblies 60, and the two stator assemblies 60 are disposed opposite to each other. Of course, the number of the stator assemblies 60 is not limited thereto, and needs to be adjusted according to specific conditions.

In some embodiments, please refer to FIG. 1, the motor further includes a controller 70. A fourth air duct with an air outlet is enclosed between the controller 70 and the rear end of the rear housing, so that after dissipating heat from the components on the controller such as an MOS, a power module, a chip and a copper foil, the airflow flows out to avoid the situation that the components such as the MOS, the power module, the chip and the copper foil are burnt out.

In some embodiments, please refer to FIG. 1 and FIG. 3, the stator assembly 60 is fixed in the rear housing 20 or on a fixing bracket 51 of the rotor assembly 50.

The following describes a flow process of the airflow in conjunction with FIG. 1 (the arrow direction in FIG. 1 is a flow direction of the airflow):

The rotation of the rotor assembly drives the impeller to rotate. The airflow enters the front housing through the air inlet, enters the diffuser after passing through the impeller, and enters the rear housing through a communication port between the front housing and the rear housing after being pressurized by the diffuser. The airflow cools the parts in the rear housing, such as the bearing, the winding and the permanent magnet, then dissipates heat from the components on the controller (the MOS, power module, chip, copper foil and the like), and finally flows out from the air outlet enclosed between the rear housing and the controller.

In some embodiments, the fourth inner wall and the fifth outer wall of the front housing are not disposed, and at this time, the rear end of the third inner wall 13 forms the rear end of the rear inner wall.

In some embodiments, the second inner wall and the third outer wall of the front housing are not disposed. At this time, the first inner wall and the third inner wall are directly connected, and the second outer wall and the fourth outer wall are directly connected.

In some embodiments, the first inner wall section and the first outer wall section of the rear housing are not disposed.

The present disclosure also provides a motor, including a housing, an impeller 30, a diffuser 40, a rotor assembly 50, and a stator assembly 60. The motor has an air inlet and an air outlet. The air inlet is disposed on the housing. The impeller 30 and the diffuser 40 are disposed in the housing. The impeller 30 is disposed adjacent to the air inlet and is connected to the rotor assembly 50. The diffuser 40 is located downstream of the impeller 30. The stator assembly 60 is located downstream of the diffuser 40. The housing includes a front housing 10 and a rear housing 20 connected to each other. A first air duct is enclosed among a rear inner wall of the front housing 10, a front inner wall of the rear housing 20 and the diffuser 40. The first air duct is in communication with an outlet of the impeller 30 and the air outlet. An inner diameter size of the rear end of the rear inner wall is less than or equal to an inner diameter size of the front end of the front inner wall, wherein the front and rear refers to the front and rear direction in FIG. 1. A longitudinal cross-section of the first air duct is U-shaped. The inner wall of the front housing 10 is smooth to avoid backflow of the airflow.

The present disclosure also provides a vacuum cleaner including a motor. The motor includes a housing, an impeller 30, a diffuser 40, a rotor assembly 50, and a stator assembly

60. The motor has an air inlet and an air outlet. The air inlet is disposed on the housing. The impeller 30 and the diffuser 40 are disposed in the housing. The impeller 30 is disposed adjacent to the air inlet and is connected to the rotor assembly 50. The diffuser 40 is located downstream of the impeller 30. The stator assembly 60 is located downstream of the diffuser 40. The housing includes a front housing 10 and a rear housing 20 connected to each other. A first air duct is enclosed among a rear inner wall of the front housing 10, a front inner wall of the rear housing 20 and the diffuser 40. The first air duct is in communication with an outlet of the impeller 30 and the air outlet. An inner diameter size of the rear end of the rear inner wall is less than or equal to an inner diameter size of the front end of the front inner wall, wherein the front and rear refers to the front and rear direction in FIG. 1.

Figure 4:
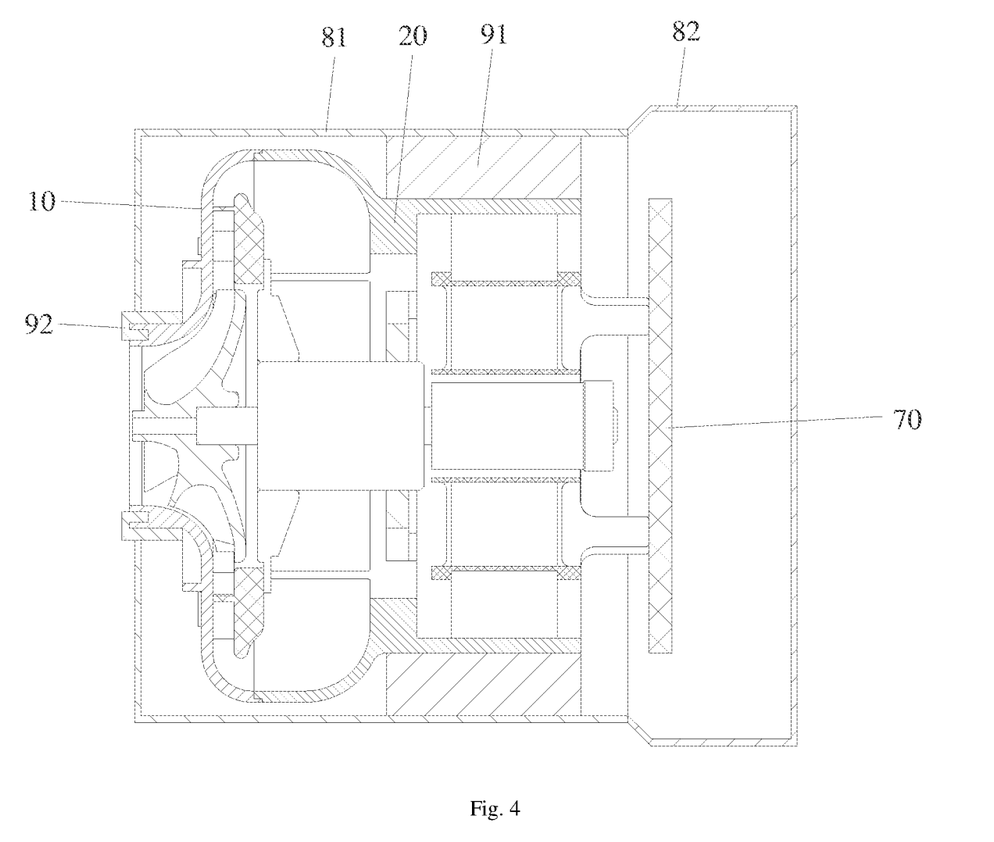
FIG. 4 shows a schematic cross-sectional diagram of the body of a vacuum cleaner according to the present disclosure.

In some embodiments, referring to FIG. 4, the vacuum cleaner further includes a cabinet 81 and a rear cover 82 connected to the cabinet 81. The cabinet 81 has a front mounting port. The motor is mounted in a cavity enclosed by the cabinet 81 and the rear cover 82.

In some embodiments, the vacuum cleaner further includes a first shock-absorbing member 91 and a second shock-absorbing member 92. The first shock-absorbing member 91 sleeves the third outer wall section and an outer peripheral wall thereof is matched with the inner wall of the cabinet 81. The third outer wall section is convenient for the mounting of the first shock-absorbing member. A mounting groove is disposed in the front end surface of the front housing 10. The second shock-absorbing member 92 sleeves the first outer wall and an outer end thereof is bent inward and then inserted into the mounting groove. An outer peripheral wall of the second shock-absorbing member 92 is matched with the front mounting port of the cabinet 81.

It can be seen from the above descriptions that the above-mentioned embodiments of the present disclosure achieve the following technical effects:

The kinetic energy loss of the airflow is reduced, the eddy current and noise are reduced, the mounting is simplified, there is no need to consider the mounting airtightness, a motor size is reduced, and a power density is improved.

Obviously, the above embodiments are merely examples for clear explanation, and are not intended to limit the implementations. For those of ordinary skill in the art, other changes or modifications in different forms can further be made on the basis of the above explanation. There is no need and incapable of giving an exhaustive list of some of these implementations. The obvious changes or modifications derived therefrom are still within the scope of protection of the present disclosure.

DESCRIPTION OF REFERENCE SIGNS

10, front housing; 11, first inner wall; 12, second inner wall; 13, third inner wall; 14, fourth inner wall; 15, fifth inner wall; 16, outer wall; 20, rear housing; 21, first inner wall section; 22, second inner wall section; 23, third inner wall section; 24, fourth inner wall section; 25, fifth inner wall section; 26, sixth inner wall section; 30, impeller; 40, diffuser; 50, rotor assembly; 51, fixing bracket; 60, stator assembly; 61, frame; 62, iron core; 621, air duct hole; 63, winding; 631, third air duct; 70, controller; 81, cabinet; 82, rear cover; 91, first shock-absorbing member; 92, second shock-absorbing member.

The invention claimed is:

1. A centrifugal fan, comprising a housing, an impeller, a diffuser, a rotor assembly and a stator assembly,
   wherein the centrifugal fan has an air inlet and an air outlet, the air inlet is disposed on the housing, the impeller and the diffuser are disposed in the housing, the impeller is disposed adjacent to the air inlet and is connected to the rotor assembly, the diffuser is located downstream of the impeller, the stator assembly is located downstream of the diffuser;
   wherein the housing comprises a front housing and a rear housing connected to each other, a first air duct is enclosed among a rear inner wall of the front housing, a front inner wall of the rear housing and the diffuser, the first air duct is in communication with an outlet of the impeller and the air outlet, and an inner diameter size of the rear end of the rear inner wall is less than or equal to an inner diameter size of the front end of the front inner wall;
   wherein the entirety of the first air duct is only formed by the rear inner wall of the front housing, the front inner wall of the rear housing and the diffuser and a longitudinal cross-section of the first air duct is U-shaped;
   wherein the front inner wall of the rear housing comprises a first inner wall section, a second inner wall section, and a third inner wall section which are connected in sequence, a longitudinal cross-section of the first inner wall section is linear along the axial direction of the impeller, a longitudinal cross-section of the second inner wall section is in an arc shape which is concavely curved relative to the diffuser, a longitudinal cross-section of the third inner wall section is linear along the radial direction of the impeller, and the first inner wall section forms the front end of the front inner wall; and
   wherein the diffuser comprises an annular plate, which is located radially outward of the impeller along the radial direction of the impeller, the annular plate comprises a front plane near the impeller, a rear plane near the stator assembly and a radial outer surface connected with the front plane and the rear plane and located between the front plane and the rear plane along the axial direction of the impeller, each of the front plane and the rear plane has a longitudinal cross-section in a straight line shape along the radial direction of the impeller respectively, the rear plane faces the third inner wall section of the rear housing, and an interval between the rear plane and the third inner wall section forms a part of the first air duct.

2. The centrifugal fan according to claim 1, wherein the rear inner wall of the front housing is smooth to avoid backflow of airflow.

3. The centrifugal fan according to claim 2,
   wherein the rear inner wall of the front housing comprises a first inner wall, a second inner wall and a third inner wall which are connected in sequence,
   the first inner wall is disposed corresponding to the impeller, a longitudinal cross-section of the first inner wall is in an arc shape which is convexly curved relative to the impeller,
   the second inner wall and the third inner wall are disposed corresponding to the diffuser, a longitudinal cross-section of the second inner wall is linear along a radial direction of the impeller, and
   the longitudinal cross-section of the third inner wall is in an arc shape which is concavely curved relative to the diffuser.

4. The centrifugal fan according to claim 3, wherein the first inner wall is gradually transitioned outward from an axial direction of the impeller to the second inner wall.

5. The centrifugal fan according to claim 3, wherein the rear inner wall of the front housing further comprises a fourth inner wall connected to the rear end of the third inner wall, a longitudinal cross-section of the fourth inner wall is linear along the axial direction of the impeller, the fourth inner wall is disposed corresponding to the diffuser, and the fourth inner wall forms the rear end of the rear inner wall.

6. The centrifugal fan according to claim 1, wherein a material of the impeller is a non-metallic material.

7. The centrifugal fan according to claim 6, wherein the material of the impeller is PEEK.

8. The centrifugal fan according to claim 1, wherein the stator assembly is located in the rear housing, a second air duct is enclosed between inner walls of the stator assembly and the rear housing, and the second air duct is in communication with the first air duct and the air outlet.

9. The centrifugal fan according to claim 8, wherein the stator assembly comprises a frame and an iron core and a winding which are fixed on the frame, the iron core is provided with an air duct hole, the air duct hole is in communication with the first air duct and the air outlet, and/or, a third air duct is disposed in the winding, and the third air duct is in communication with the first air duct and the air outlet.

10. The centrifugal fan according to claim 1, wherein the stator assembly is fixed in the rear housing or on a fixing bracket of the rotor assembly.

11. A vacuum cleaner, comprising a centrifugal fan,
wherein the centrifugal fan comprises a housing, an impeller, a diffuser, a rotor assembly and a stator assembly;
wherein the centrifugal fan has an air inlet and an air outlet, the air inlet is disposed on the housing, the impeller and the diffuser are disposed in the housing, the impeller is disposed adjacent to the air inlet and is connected to the rotor assembly, the diffuser is located downstream of the impeller, the stator assembly is located downstream of the diffuser;
wherein the housing comprises a front housing and a rear housing which are connected to each other, a first air duct is enclosed among a rear inner wall of the front housing, a front inner wall of the rear housing and the diffuser, the first air duct is in communication with an outlet of the impeller and the air outlet, and an inner diameter size of the rear end of the rear inner wall is less than or equal to an inner diameter size of the front end of the front inner wall;
wherein the entirety of the first air duct is only formed by the rear inner wall of the front housing, the front inner wall of the rear housing and the diffuser and a longitudinal cross-section of the first air duct is U-shaped;
wherein the front inner wall of the rear housing comprises a first inner wall section, a second inner wall section, and a third inner wall section which are connected in sequence, a longitudinal cross-section of the first inner wall section is linear along the axial direction of the impeller, a longitudinal cross-section of the second inner wall section is in an arc shape which is concavely curved relative to the diffuser, a longitudinal cross-section of the third inner wall section is linear along the radial direction of the impeller, and the first inner wall section forms the front end of the front inner wall; and
wherein the diffuser comprises an annular plate, which is located radially outward of the impeller along the radial direction of the impeller, the annular plate comprises a front plane near the impeller, a rear plane near the stator assembly and a radial outer surface connected with the front plane and the rear plane and located between the front plane and the rear plane along the axial direction of the impeller, each of the front plane and the rear plane has a longitudinal cross-section in a straight line shape along the radial direction of the impeller respectively, the rear plane faces the third inner wall section of the rear housing, and an interval between the rear plane and the third inner wall section forms a part of the first air duct.

12. The vacuum cleaner according to claim 11, wherein the rear inner wall of the front housing is smooth to avoid backflow of airflow.

13. The vacuum cleaner according to claim 12,
wherein the rear inner wall of the front housing comprises a first inner wall, a second inner wall and a third inner wall which are connected in sequence,
the first inner wall is disposed corresponding to the impeller, a longitudinal cross-section of the first inner wall is in an arc shape which is convexly curved relative to the impeller,
the second inner wall and the third inner wall are disposed corresponding to the diffuser, a longitudinal cross-section of the second inner wall is linear along a radial direction of the impeller, and
the longitudinal cross-section of the third inner wall is in an arc shape which is concavely curved relative to the diffuser.

14. The vacuum cleaner according to claim 13, wherein the first inner wall is gradually transitioned outward from an axial direction of the impeller to the second inner wall.

15. The vacuum cleaner according to claim 13, wherein the rear inner wall of the front housing further comprises a fourth inner wall connected to the rear end of the third inner wall, a longitudinal cross-section of the fourth inner wall is linear along the axial direction of the impeller, the fourth inner wall is disposed corresponding to the diffuser, and the fourth inner wall forms the rear end of the rear inner wall.

* * * * *